United States Patent
Iwamoto

(10) Patent No.: US 9,482,908 B2
(45) Date of Patent: Nov. 1, 2016

(54) LIQUID CRYSTAL DISPLAY ELEMENT

(71) Applicant: STANLEY ELECTRIC CO., LTD., Meguro-ku, Tokyo (JP)

(72) Inventor: Yoshihisa Iwamoto, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/582,039

(22) Filed: Dec. 23, 2014

(65) Prior Publication Data

US 2015/0177576 A1    Jun. 25, 2015

(30) Foreign Application Priority Data

Dec. 25, 2013    (JP) .................................. 2013-266267

(51) Int. Cl.
*G02F 1/1343*    (2006.01)
*G02F 1/1337*    (2006.01)

(52) U.S. Cl.
CPC ..... *G02F 1/134309* (2013.01); *G02F 1/13439* (2013.01); *G02F 1/133707* (2013.01); *G02F 1/134336* (2013.01); *G02F 2001/133742* (2013.01); *G02F 2001/134318* (2013.01)

(58) Field of Classification Search
CPC .................. G02F 1/134309; G02F 1/133707; G02F 1/13439; G02F 1/134336; G02F 2001/134318; G02F 2001/133742
See application file for complete search history.

(56) References Cited

U.S. PATENT DOCUMENTS

| | | | |
|---|---|---|---|
| 2002/0159018 A1* | 10/2002 | Kataoka | G02F 1/133707 349/143 |
| 2003/0193625 A1* | 10/2003 | Yoshida | G02F 1/1393 349/43 |
| 2004/0165136 A1 | 8/2004 | Sugiyama et al. | |

FOREIGN PATENT DOCUMENTS

| | | | |
|---|---|---|---|
| JP | 2004252298 A | 9/2004 | |
| JP | 2009122271 A * | 6/2009 | G02F 1/1343 |
| JP | 2011090124 A | 5/2011 | |

OTHER PUBLICATIONS

Extended European Search Report dated Apr. 15, 2015, issued in counterpart European Application No. 14198801.4.

* cited by examiner

*Primary Examiner* — Donald Raleigh
(74) *Attorney, Agent, or Firm* — Holtz, Holtz & Volek PC

(57) ABSTRACT

Provided is a liquid crystal display element including: a first substrate which includes a first electrode; a second substrate which is disposed to oppose the first substrate and includes a second electrode; and a liquid crystal layer which is disposed between the first substrate and the second substrate, in which at least one of the first electrode and the second electrode includes a plurality of openings which are elongated in a first direction and are adjacent to each other along the first direction, and when two openings of the plurality of openings which are adjacent to each other along the first direction are viewed, one of opening widths of opposing portions is large and the other thereof is small.

12 Claims, 13 Drawing Sheets

COMMON SLIT

SEGMENT SLIT

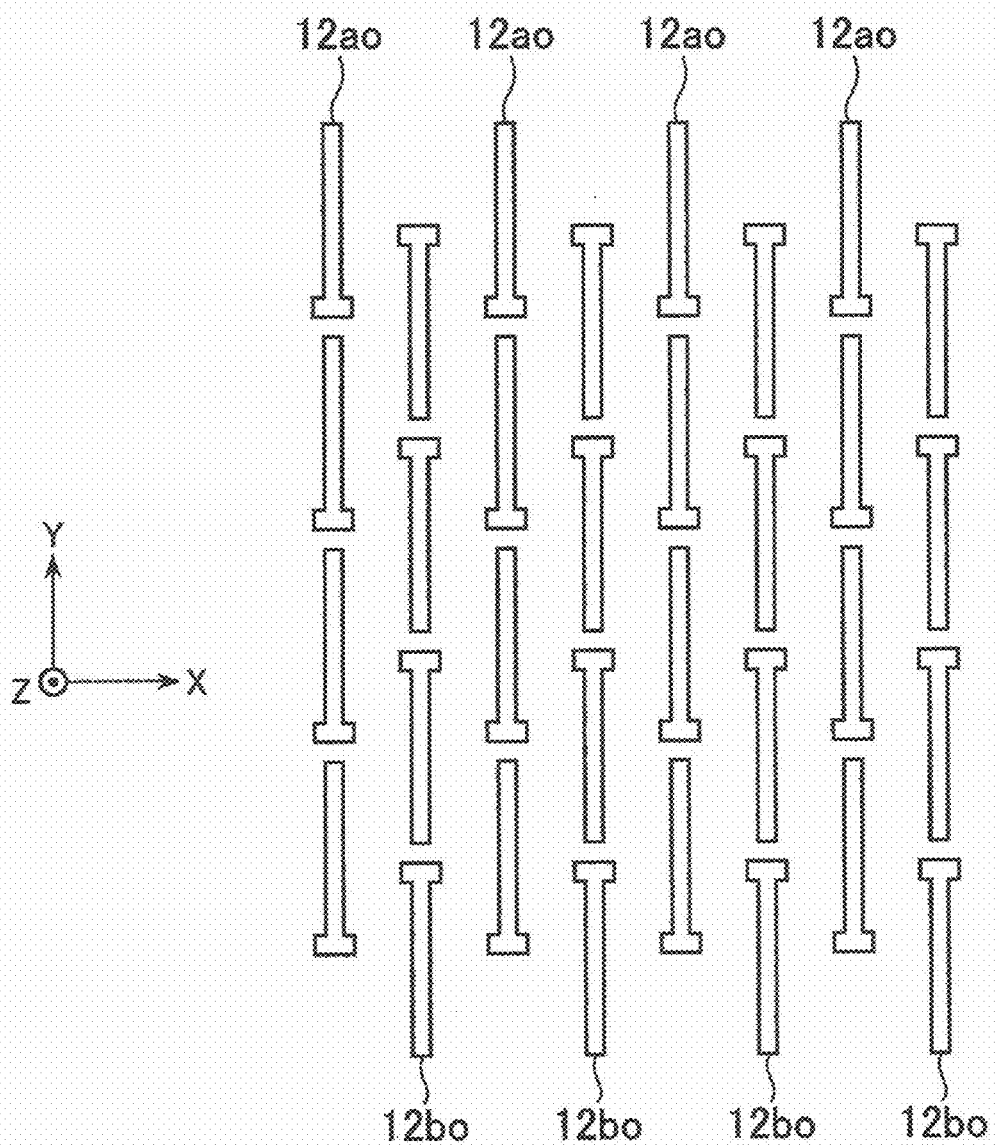

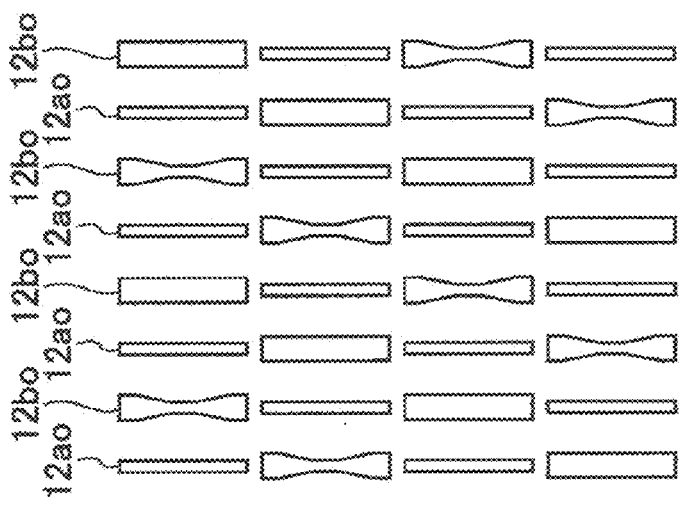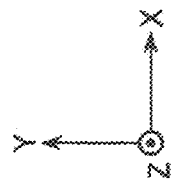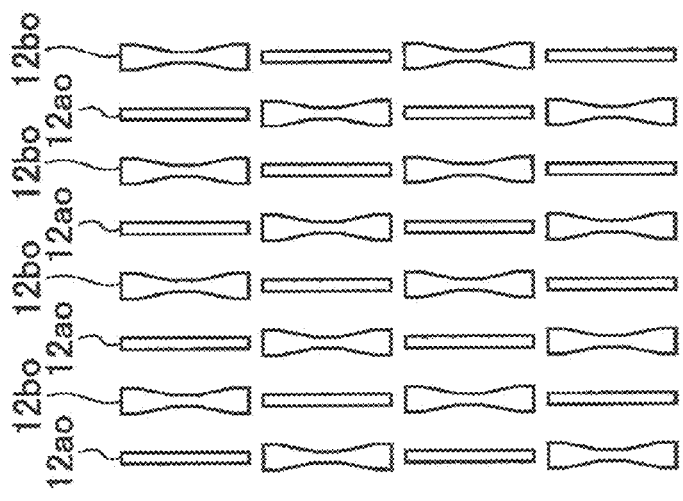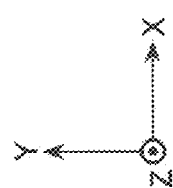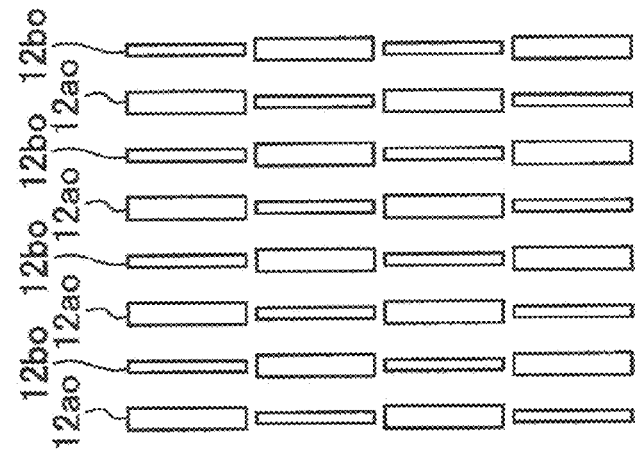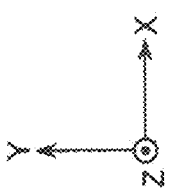

FIG. 11A    FIG. 11B    FIG. 11C
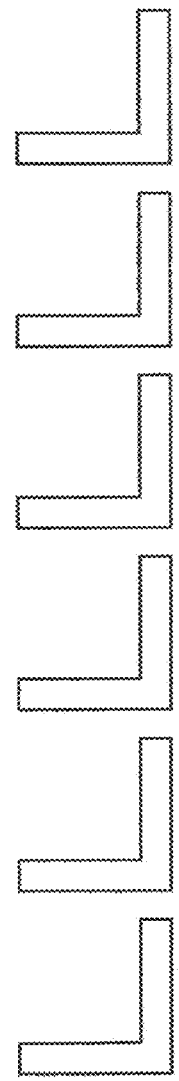 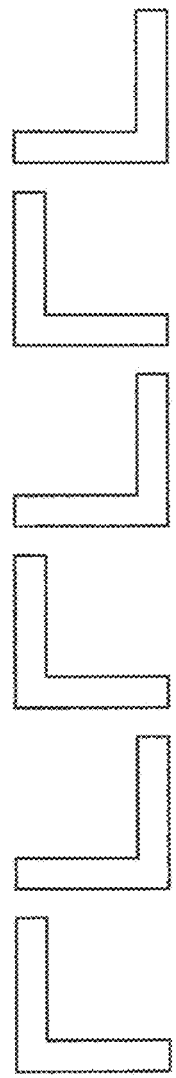 
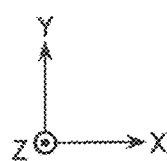 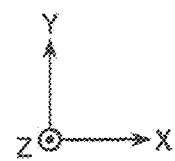 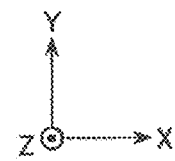

FIG. 13A
FIG. 13B
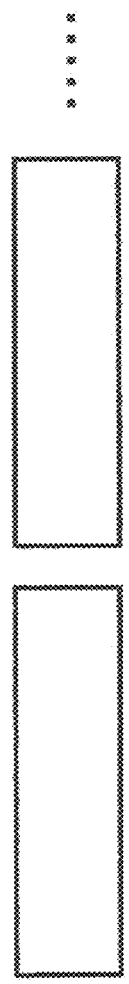

LIQUID CRYSTAL DISPLAY ELEMENT

CROSS-REFERENCE TO RELATED APPLICATION

This application is based upon and claims the benefit of priority of the prior Japanese Patent Applications No. JP 2013-266267, filed on Dec. 25, 2013, the entire contents of which are incorporated herein by reference.

BACKGROUND OF THE INVENTION

A) Field of the Invention

The present invention relates to a liquid crystal display element.

B) Description of the Related Art

The invention of a liquid crystal display element in which a plurality of slit-like openings are provided in the longitudinal direction thereof at equal intervals in electrodes on a pair of substrates that are disposed to oppose each other is invented by the inventor (refer to Japanese Unexamined Patent Application Publication No. 2004-252298). The slit-like openings of the electrode on one substrate and the slit-like openings of the electrode on the other substrate are alternately arranged in a direction perpendicular to the longitudinal direction of the slits (width direction). When a voltage is applied between the electrodes, an oblique electric field is generated due to the slit-like openings, and two-domain alignment in which the alignment directions of liquid crystal molecules are different from each other by 180 degrees along the width direction of the openings is realized.

However, in the liquid crystal display element described in Japanese Unexamined Patent Application Publication No. 2004-252298, there may be cases where a dark region caused by alignment defect is generated between the slit-like openings adjacent to each other in the longitudinal direction during a bright display and thus transmittance and display uniformity of the liquid crystal display element are reduced. Here, the inventor had suggested reducing the distance between the two slit-like openings that are adjacent to each other in the longitudinal direction to be smaller than an opening width (refer to Japanese Unexamined Patent Application Publication No. 2009-122271). In addition, the opening widths of the two slit-like openings that are adjacent to each other in the longitudinal direction are equal to each other. Furthermore, the slit-like openings are formed by, for example, forming a photoresist pattern having slit-like openings and performing etching using the photoresist as an etching mask.

SUMMARY OF THE INVENTION

In a pattern arrangement method of reducing the distance between the two slit-like openings that are adjacent to each other in the longitudinal direction to be smaller than the opening width (refer to Japanese Unexamined Patent Application Publication No. 2009-122271), for example, reducing the distance between the slit-like openings that are adjacent to each other as much as possible is effective. However, in this case, during etching, the openings that are adjacent to each other may be connected to each other, and thus the pattern may be opened.

FIG. 12 illustrates a reflection microscope observation image of an element (empty cell) in which the distance between slit-like openings is smaller than the opening width. During the manufacturing of the element, a slit width on a photomask is 0.015 mm, and the distance between the slits adjacent to each other in the longitudinal direction is 0.0075 mm.

In both a front side electrode (common electrode) and a rear side electrode (segment electrode), a state where the slit-like openings are not separated from each other but are connected to each other (the slit-like openings which have to be separated from each other in the longitudinal direction are joined to each other) is observed.

FIG. 13A is a schematic view illustrating parts of the slit patterns on the photomask (two slit patterns adjacent to each other in the longitudinal direction). As illustrated in this figure, the slit patterns which are separated from each other are formed on the photomask.

FIG. 13B is a schematic view illustrating parts of the openings which are formed in the electrode. The solid line indicates the outline of the openings, and the dotted line indicates the slit patterns (see FIG. 13A) on the photomask. The openings which are formed on the electrode through a photolithography process and an etching process are not separated from each other at the position where they have to be separated from each other, but are connected to each other. Compared to the slit patterns on the photomask, the corners of the patterns are removed and the patterns protrude toward the opposite slit pattern side (a region between the slits) such that the slit-like openings which have to be separated from each other are formed to be joined to each other.

Due to the joining of the slit-like openings which have to be separated from each other in the longitudinal direction, for example, non-display (non-lighting) occurs in a display unit.

As a result of study by the inventor, when the distance between the two slit patterns adjacent to each other in the longitudinal direction was 0.01 mm on the photomask, it was seen that the joining of slit-like openings formed on the electrode was significantly reduced and the connection between the slit-like openings of the electrode had still occurred. Accordingly, it is preferable that the distance between the slit patterns in the longitudinal direction on the photomask be greater than 0.01 mm. However, in this case, according to the technique described in Japanese Unexamined Patent Application Publication No. 2009-122271, the slit width is also greater than 0.01 mm.

The inventor had studied a liquid crystal display element which realizes high quality display by reducing the distance between slit patterns in the longitudinal direction and slit widths and separating electrode openings from each other with high reliability.

It is an object of the present invention to provide a liquid crystal display element having high display quality.

According to an aspect of the present invention, there is provided a liquid crystal display element including: a first substrate which includes a first electrode; a second substrate which is disposed to oppose the first substrate and includes a second electrode; and a liquid crystal layer which is disposed between the first substrate and the second substrate, in which at least one of the first electrode and the second electrode includes a plurality of openings which are elongated in a first direction and are adjacent to each other along the first direction, and when two openings of the plurality of openings which are adjacent to each other along the first direction are viewed, one of opening widths of opposing portions is large and the other thereof is small.

According to the present invention, a liquid crystal display element having high display quality can be provided.

BRIEF DESCRIPTION OF THE DRAWINGS

FIG. 8 is a schematic plan view of openings which are respectively formed in a front side electrode and a rear side electrode of a liquid crystal display element according to a sixth embodiment when viewed in the normal direction of substrates.

FIGS. 10A to 10C are schematic plan views illustrating openings of liquid crystal display elements according to modification examples.

FIGS. 11A to 11C are schematic plan views illustrating openings of liquid crystal display elements according to modification examples.

FIG. 13A is a schematic view illustrating parts of slit patterns on a photomask, and FIG. 13B is a schematic view illustrating parts of openings which are formed in an electrode.

DESCRIPTION OF EMBODIMENTS

Figure 1:
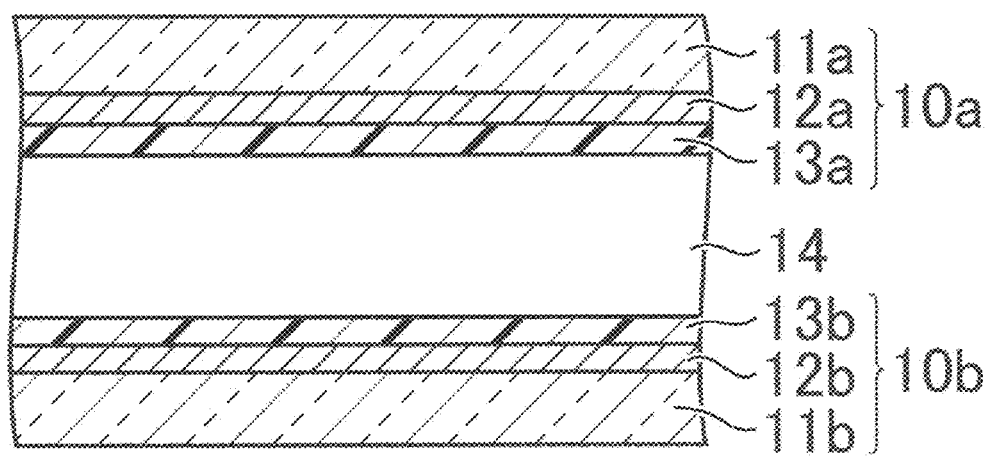
FIG. 1 is a schematic cross-sectional view of a liquid crystal display element according to a first embodiment.

FIG. 1 is a schematic cross-sectional view of a liquid crystal display element according to a first embodiment.

The liquid crystal display element according to the first embodiment is configured to include a front side substrate 10a and a rear side substrate 10b which are arranged to be separated from each other and to oppose each other substantially in parallel, and a liquid crystal layer 14 disposed between both the substrates 10a and 10b.

The front side substrate 10a includes a front side transparent substrate 11a, a front side electrode (common electrode) 12a formed on the front side transparent substrate 11a, and a front side alignment film 13a formed on the front side electrode 12a. Similarly, the rear side substrate 10b includes a rear side transparent substrate 11b, a rear side electrode (segment electrode) 12b formed on the rear side transparent substrate 11b, and a rear side alignment film 13b formed on the rear side electrode 12b.

The front side transparent substrate 11a and the rear side transparent substrate 11b are, for example, glass substrates. The front side electrode 12a and the rear side electrode 12b are formed of, for example, a transparent conductive material such as ITO. The front side electrode 12a and the rear side electrode 12b respectively include openings which are elongated in one direction. Both the electrodes 12a and 12b overlap each other with the liquid crystal layer 14 interposed therebetween, and demarcate a display region.

The liquid crystal layer 14 is a liquid crystal layer which is disposed between the front side alignment film 13a of the front side substrate 10a and the rear side alignment film 13b of the rear side substrate 10b and is, for example, vertically oriented.

In addition, polarizing plates are respectively disposed on sides of the front side substrate 10a and the rear side substrate 10b opposite to the liquid crystal layer 14 as, for example, crossed-Nicol.

Figure 2:
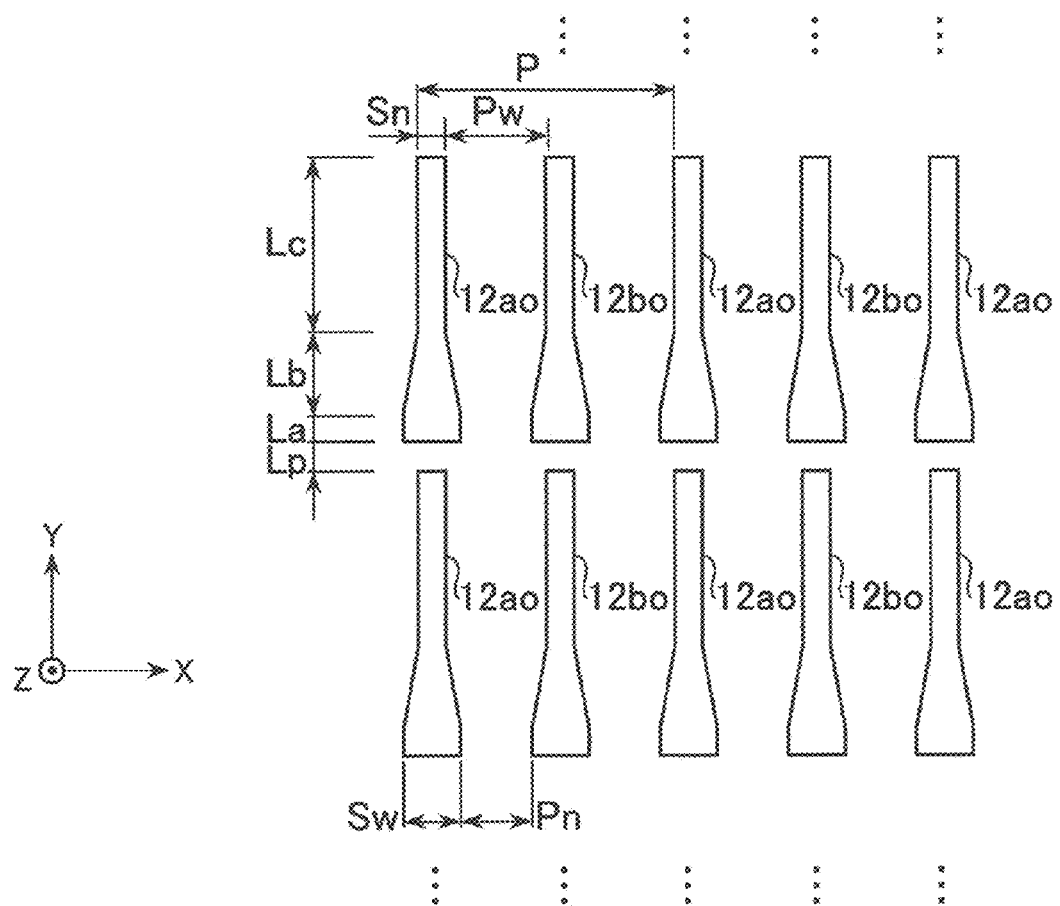
FIG. 2 is a schematic plan view of openings which are respectively formed in a front side electrode and a rear side electrode when viewed in a normal direction of substrates.

FIG. 2 is a schematic plan view of openings 12ao and 12bo which are respectively formed in the front side electrode 12a and the rear side electrode 12b when viewed in the normal direction of the substrates 10a and 10b.

In the front side electrode 12a, a plurality of openings 12ao which are elongated in the Y-axis direction extend in the lengthwise direction (Y-axis direction) so that the distance between the openings (the distance between short side edges) is Lp. In addition, the plurality of openings 12ao are regularly arranged in the width direction (X-axis direction) at a pitch P.

Similarly, in the rear side electrode 12b, a plurality of openings 12bo which are elongated in the Y-axis direction extend in the lengthwise direction (Y-axis direction) so that the distance between the openings is Lp. In addition, the plurality of openings 12bo are regularly arranged in the width direction (X-axis direction) at the pitch P. The opening 12ao and the opening 12bo have the same shape. The opening 12bo is disposed to be shifted from the opening 12ao by half of the pitch in the X-axis direction. Therefore, in a plan view (when viewed in the normal direction of the substrates 10a and 10b), the openings 12ao and the openings 12bo are alternately arranged at equal intervals along the X-axis direction (the direction intersecting the Y-axis direction). In addition, the Z-axis direction is the normal direction of the substrates 10a and 10b.

Since the openings 12ao and 12bo are arranged in the electrodes 12a and 12b, for example, as illustrated in this figure, when a voltage is applied between both the electrodes 12a and 12b, in the plan view, an oblique electric field (an electric field in which the electric field direction is inclined with respect to the normal direction of the substrates 10a and 10b) is generated in the liquid crystal layer 14 between the openings 12ao and 12bo which are adjacent to each other in the X-axis direction. In addition, the directions of the oblique electric fields on both the openings 12ao and 12bo sides (the positive direction and the negative direction of the X axis) are opposite to each other. Therefore, when a voltage is applied, in the display region, small regions in which the orientation directions of liquid crystal molecules are opposite to each other are simultaneously formed (two-domain alignment). Therefore, the viewing angle dependences of the small regions cancel out each other, and the viewing angle dependence of the entire display region is reduced. Accordingly, visibility is enhanced, and thus display quality is enhanced.

The openings 12ao and 12bo will be described in detail.

Each of the openings 12ao and 12bo is constituted by three regions in which the lengths in the Y-axis direction are La, Lb, and Lc, that is, a rectangular region having the length La and a width (length in the X-axis direction) Sw, a rectangular region having the length Lc and a width Sn, and a trapezoidal region which connects the two regions (a trapezoidal region having an upper base Sn, a lower base Sw, and a height Lb). There is a relationship of Sw>Sn. In each of the openings 12ao and 12bo, the opening width on the positive direction side of the Y axis is small, and the opening width on the negative direction side of the Y axis is large. The region having the small opening width on the positive direction side of the Y axis (the region in which the length in the Y-axis direction is Lc) and the region having the large opening width on the negative direction side of the Y axis (the region in which the length in the Y-axis direction is La) are connected to the edges (lateral sides of the trapezoid) which are not parallel to each other in the Y-axis direction.

When the two openings 12ao adjacent to each other along the Y-axis direction are viewed, one of the opening widths of the opposing portions is Sw, and the other thereof is Sn. In addition, the distance Lp between the openings is equal to or less than the opening width Sw, and is preferably equal to or less than Sn. The same is applied to the two openings 12bo which are adjacent to each other along the Y-axis direction.

In the first embodiment, it is assumed that La=0.01 mm, Lb=0.03 mm, Lc=0.06 mm, Sw=0.02 mm, Sn=0.01 mm, and Lp=Sn. In addition, the arrangement pitch P of the openings 12ao and 12bo in the X-axis direction is assumed to be 0.09 mm. In the plan view, the distance between opening edges of the openings 12ao and 12bo which are adjacent to each other in the X-axis direction is assumed to be Pn=0.025 mm regarding the rectangular region of La×Sw, and is assumed to be Pw=0.035 mm regarding the rectangular region of Lc×Sn. Pn is the minimum value of the distances between the opening edges of the openings 12ao and 12bo which are adjacent to each other in the X-axis direction, and Pw is the maximum value thereof.

Figure 3A:
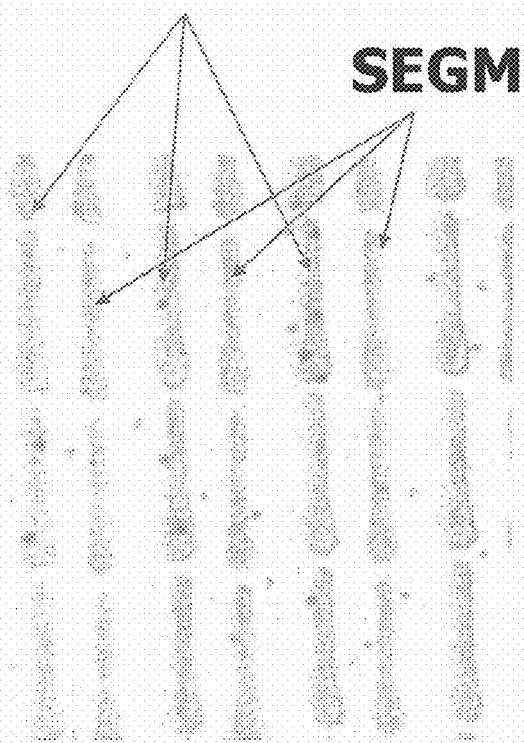
FIG. 3A is a reflection polarizing microscope observation image of empty cells during the manufacturing of the liquid crystal display element according to the first embodiment.

FIG. 3A illustrates a reflection polarizing microscope observation image of empty cells during the manufacturing of the liquid crystal display element according to the first embodiment. The plurality of openings 12ao (common slits) and the plurality of openings 12bo (segment slits) are completely separated from each other in the lengthwise direction.

The short side edges of the openings 12ao and 12bo have curve shapes which protrude toward the openings 12ao and 12bo sides (the region between the openings) that are adjacent to each other in the lengthwise direction. It is thought that this effect is caused by over-etching or the like in the pattern edge portions during an etching process or the like. Each of the openings 12ao and 12bo has an external form similar to a matchstick. When the two openings adjacent to each other along the lengthwise direction are viewed, one of the opening widths of the opposing portions is large, and the other thereof is small.

Figure 3B:
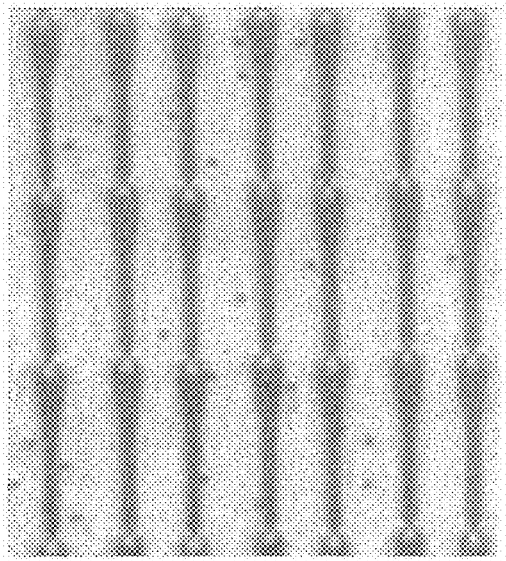
FIG. 3B is an alignment texture of the liquid crystal display element according to the first embodiment, which is observed by using a transmission microscope.

FIG. 3B is an alignment texture of the liquid crystal display element according to the first embodiment, which is observed by using a transmission microscope. A liquid crystal material having a dielectric constant anisotropy of $\Delta\varepsilon<0$ is injected into the empty cells illustrated in FIG. 3A by using a vacuum injection method and is then heated to an isotropic phase temperature of the liquid crystal material for one hour, and crossed-Nicol polarizing plates are attached so that the absorption axes are arranged in a direction at substantially 45 degrees with respect to the lengthwise direction of the opening (the Y-axis direction of FIG. 2). The texture is obtained in a state where a bright display voltage is applied between the common electrode and the segment electrode.

In the plan view, a uniform alignment state is realized between the openings adjacent to each other in the width direction of the openings (the X-axis direction of FIG. 2), and thus a good bright display can be obtained.

A dark region in a homogeneous crossed state is observed between the two openings 12ao (in a separation portion) adjacent to each other along the lengthwise direction, and no dark region is recognized on the outside of the portion (the separation portion) between the openings 12ao. The same is applied to the portion between the two openings 12bo adjacent to each other along the lengthwise direction. It is seen that between the two openings adjacent to each other along the lengthwise direction, a high-quality bright display is realized without a sense of roughness and the like, and thus a good alignment state is obtained.

The liquid crystal display element according to the first embodiment is a liquid crystal display element having high display quality, in which the distance between the two openings adjacent to each other along the lengthwise direction and the opening width are small, the openings are completely separated from each other in the lengthwise direction, and display failure such as non-display does not occur. This is an effect caused by forming one of the widths of the opposing portions to be large (Sw) and forming the other to be small (Sn) when the two openings adjacent to each other along the lengthwise direction are viewed. In addition, this is an effect caused by setting the distance (Lp) between the openings to be equal to or less than Sw and preferably, to be equal to or less than Sn.

As a result of diligent study by the inventor, for example, in a case where Sn≤Lp was satisfied on a photomask having a shape corresponding to (the same shape as) the opening 12ao illustrated in FIG. 2, it was seen that the two openings adjacent to each other along the lengthwise direction were completely separated from each other.

Figure 4A:
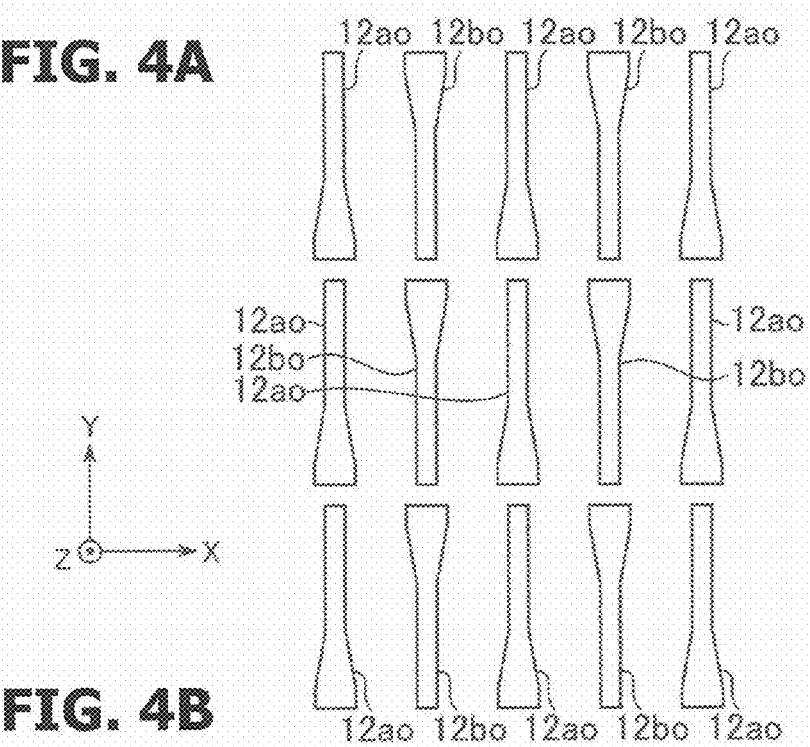
FIG. 4A is a schematic plan view of openings which are respectively formed in a front side electrode and a rear side electrode of a liquid crystal display element according to a second embodiment when viewed in the normal direction of substrates.

FIG. 4A is a schematic plan view of the openings 12ao and 12bo which are respectively formed in the front side electrode 12a and the rear side electrode 12b of a liquid crystal display element according to a second embodiment when viewed in the normal direction of the substrates 10*a* and 10*b*. The liquid crystal display element according to the second embodiment is the same as the liquid crystal display element according to the first embodiment except for the arrangement of the openings 12*ao* and 12*bo*.

In the first embodiment, the openings 12*ao* and 12*bo* having the same shape are arranged to be oriented in the same direction. However, in the second embodiment, the openings 12*ao* and 12*bo* having the same shape are arranged to be oriented in opposite directions.

Figure 4B:
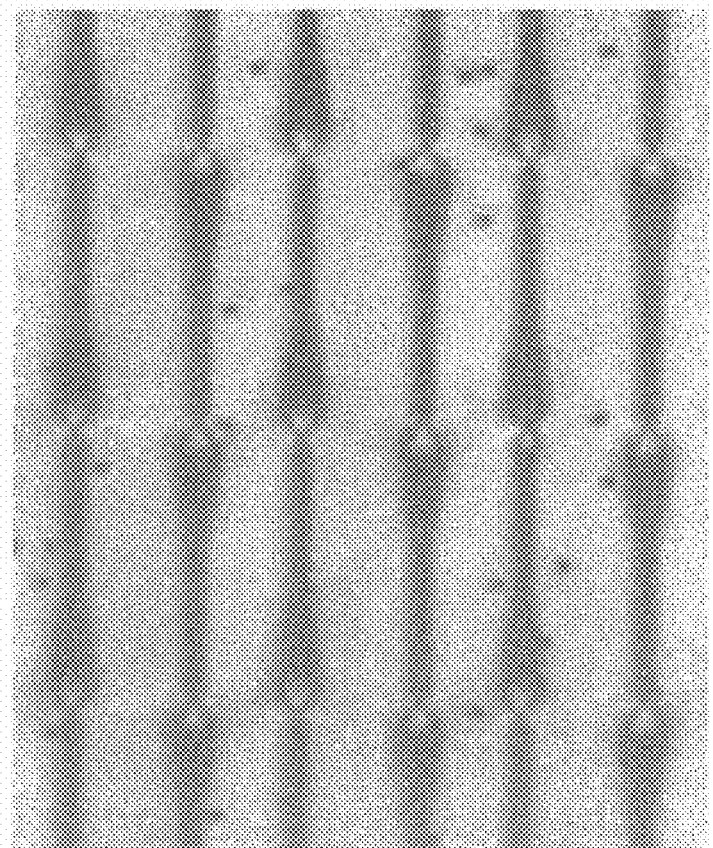
FIG. 4B is an alignment texture of the liquid crystal display element according to the second embodiment, which is observed by using a transmission microscope.

FIG. 4B is an alignment texture of the liquid crystal display element according to the second embodiment, which is observed by using a transmission microscope. The observation was performed under the same conditions as those of the observation image of the first embodiment illustrated in FIG. 3B.

Similarly to the liquid crystal display element according to the first embodiment, in the plan view, between the openings adjacent to each other in the width direction of the opening, a uniform alignment state and a good bright display can be obtained, and even between the two openings adjacent to each other along the lengthwise direction (in the separation portion), alignment defects are not recognized and a dark region in a homogeneous crossed state is observed.

The liquid crystal display element according to the second embodiment is a liquid crystal display element having high display quality which can exhibit the same effect as that of the first embodiment.

In addition, when an opening arrangement structure as in the liquid crystal display element according to the second embodiment is employed, compared to the first embodiment, an aperture ratio can be increased.

Figure 5A:
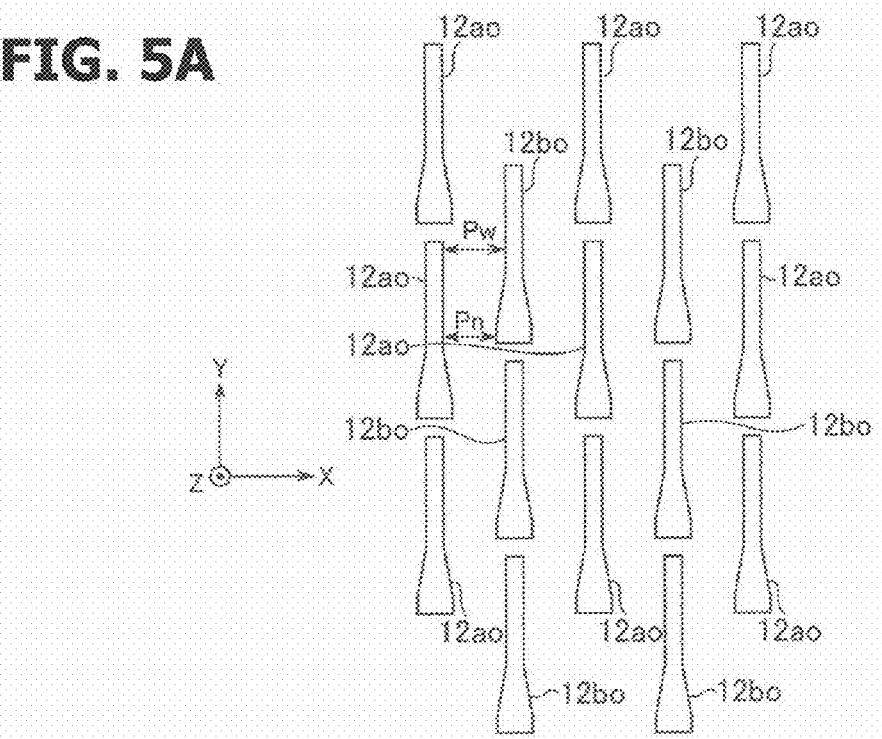
FIG. 5A is a schematic plan view of openings which are respectively formed in a front side electrode and a rear side electrode of a liquid crystal display element according to a third embodiment when viewed in the normal direction of substrates.

FIG. 5A is a schematic plan view of the openings 12*ao* and 12*bo* which are respectively formed in the front side electrode 12*a* and the rear side electrode 12*b* of a liquid crystal display element according to a third embodiment when viewed in the normal direction of the substrates 10*a* and 10*b*. The liquid crystal display element according to the third embodiment is the same as the liquid crystal display element according to the first embodiment except for the arrangement of the openings 12*ao* and 12*bo*.

In the third embodiment, the openings 12*bo* are disposed to be shifted from the openings 12*ao* by half of the pitch in the Y-axis direction. In the figure, Pw is 0.035 mm, and Pn is 0.03 mm.

Figure 5B:
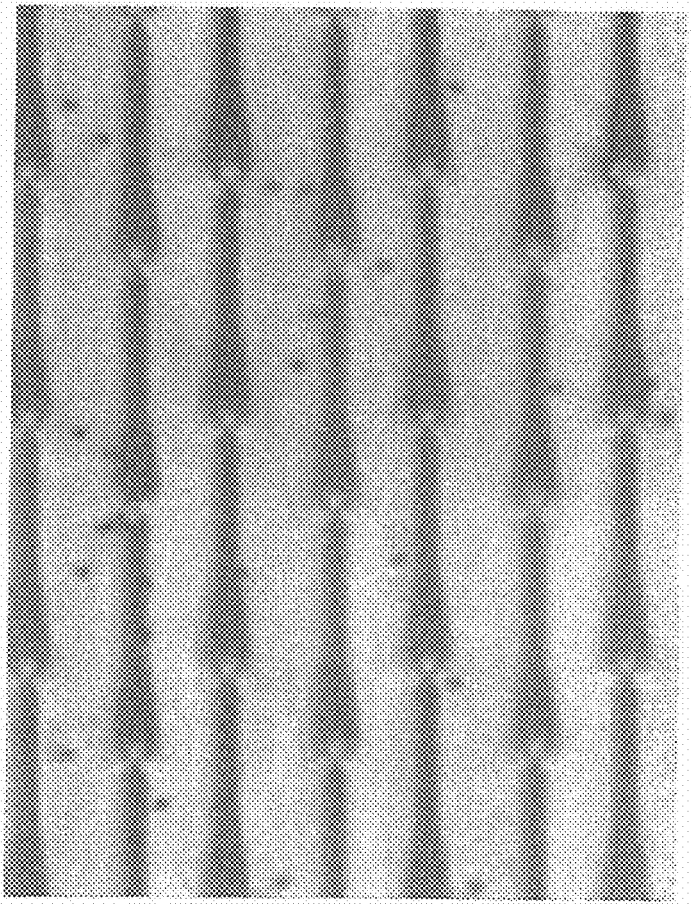
FIG. 5B is an alignment texture of the liquid crystal display element according to the third embodiment, which is observed by using a transmission microscope.

FIG. 5B is an alignment texture of the liquid crystal display element according to the third embodiment, which is observed by using a transmission microscope. The observation was performed under the same conditions as those of the observation image of the first embodiment illustrated in FIG. 3B.

Similarly to the liquid crystal display element according to the first embodiment, in the plan view, between the openings adjacent to each other in the width direction of the opening, a uniform alignment state is obtained, and even between the two openings adjacent to each other along the lengthwise direction (in the separation portion), alignment defects are not generated.

The liquid crystal display element according to the third embodiment can also exhibit the same effect as that of the first embodiment.

In addition, in the third embodiment, the openings 12*bo* are disposed to be shifted from the openings 12*ao* by half of the pitch in the Y-axis direction, and the shifting amount is not limited.

Figure 6A:
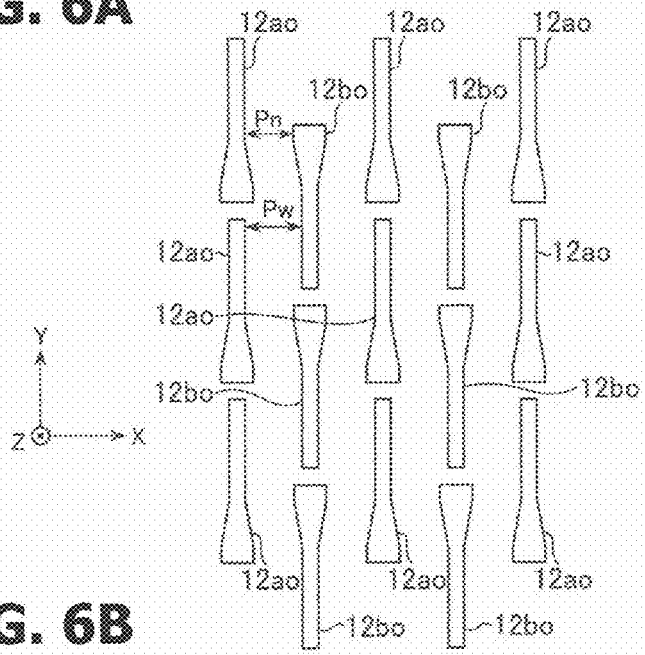
FIG. 6A is a schematic plan view of openings which are respectively formed in a front side electrode and a rear side electrode of a liquid crystal display element according to a fourth embodiment when viewed in the normal direction of substrates.

FIG. 6A is a schematic plan view of the openings 12*ao* and 12*bo* which are respectively formed in the front side electrode 12*a* and the rear side electrode 12*b* of a liquid crystal display element according to a fourth embodiment when viewed in the normal direction of the substrates 10*a* and 10*b*. In the third embodiment, the openings 12*ao* and 12*bo* having the same shape are arranged to be oriented in the same direction. However, in the fourth embodiment, the openings 12*ao* and 12*bo* having the same shape are arranged to be oriented in opposite directions. In addition, in the fourth embodiment, the positions of the trapezoidal regions (the trapezoidal region having the upper base Sn, the lower base Sw, and the height Lb) of the openings 12*ao* and 12*bo* are aligned with each other in the X-axis direction. The liquid crystal display element according to the fourth embodiment is the same as the liquid crystal display element according to the third embodiment except for the arrangement of the openings 12*ao* and 12*bo*. Pw and Pn also have the same values as those of the third embodiment.

Figure 6B:
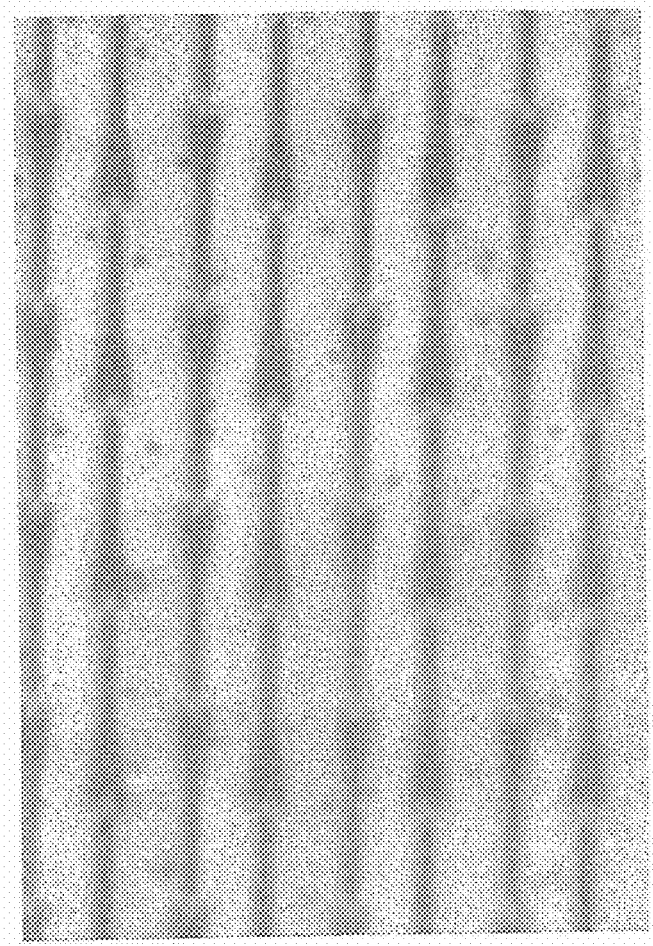
FIG. 6B is an alignment texture of the liquid crystal display element according to the fourth embodiment, which is observed by using a transmission microscope.

FIG. 6B is an alignment texture of the liquid crystal display element according to the fourth embodiment, which is observed by using a transmission microscope. The observation was performed under the same conditions as those of the observation image of the first embodiment illustrated in FIG. 3B.

Similarly to the liquid crystal display element according to the first embodiment, in the plan view, between the openings adjacent to each other in the width direction of the opening, a uniform alignment state is obtained, and even between the two openings adjacent to each other along the lengthwise direction (in the separation portion), alignment defects are not generated.

The liquid crystal display element according to the fourth embodiment can also exhibit the same effect as that of the first embodiment.

In addition, when an opening arrangement structure as in the liquid crystal display element according to the fourth embodiment is employed, an aperture ratio can be increased compared to the third embodiment.

In the fourth embodiment, the positions of the trapezoidal regions of the openings 12*ao* and 12*bo* are aligned with each other in the X-axis direction, and the amount of the opening 12*bo* being shifted from the opening 12*ao* is not limited.

A reduction in the arrangement area of the openings per electrode unit area results in the enhancement in transmittance of the liquid crystal display element. Liquid crystal display elements according to fifth to eighth embodiments are examples of the liquid crystal display element in which the arrangement area of the openings per electrode unit area is reduced. Even in the fifth to eighth embodiments, when the two openings adjacent to each other in the lengthwise direction are viewed, one of the widths of the opposing portions is large (Sw), and the other thereof is small (Sn). In addition, the distance (Lp) between the openings is equal to or less than Sw, and preferably equal to or less than Sn.

Figure 7A:
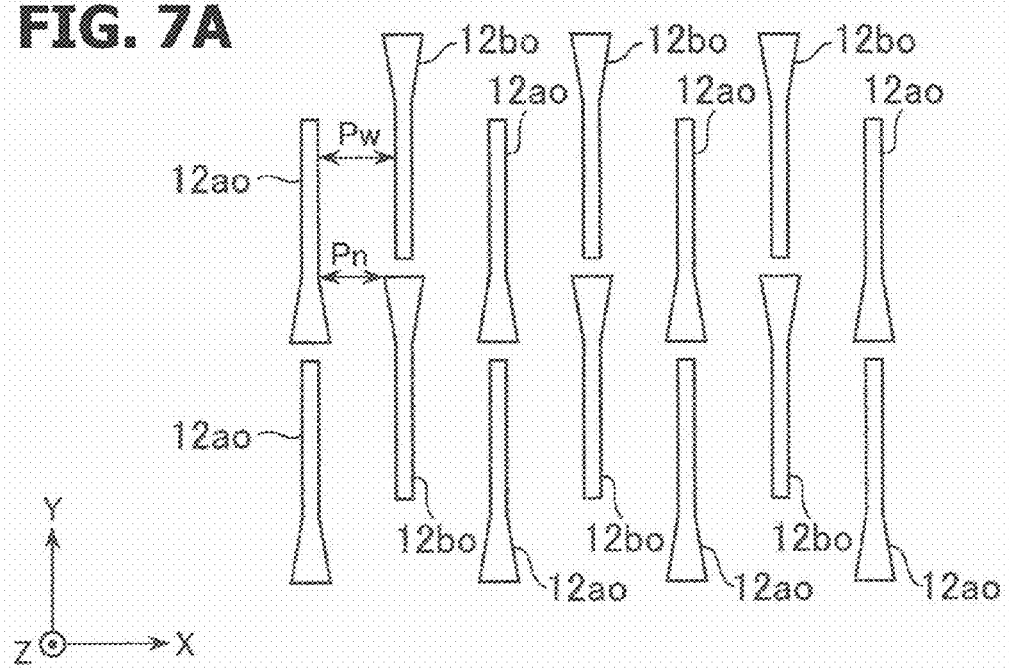
FIG. 7A is a schematic plan view of openings which are respectively formed in a front side electrode and a rear side electrode of a liquid crystal display element according to a fifth embodiment when viewed in the normal direction of substrates.

FIG. 7A is a schematic plan view of the openings 12*ao* and 12*bo* which are respectively formed in the front side electrode 12*a* and the rear side electrode 12*b* of the liquid crystal display element according to the fifth embodiment when viewed in the normal direction of the substrates 10*a* and 10*b*. In the first embodiment, each of the openings 12*ao* and 12*bo* is constituted by the three regions in which the lengths in the Y-axis direction are La, Lb, and Lc. However, in the fifth embodiment, each of the openings 12*ao* and 12*bo* does not include the region having the length La and is constituted by the rectangular region having the length Lc and the width Sn and the trapezoidal region (the trapezoidal region having the upper base Sn, the lower base Sw, and the height Lb). In the fifth embodiment, it is assumed that Lb=0.03 mm, Lc=0.07 mm, Sw=0.015 mm, Sn=0.0075 mm, Lp=Sn, P=0.084 mm, Pw=0.035 mm, and Pn=0.03 mm.

Figure 7B:
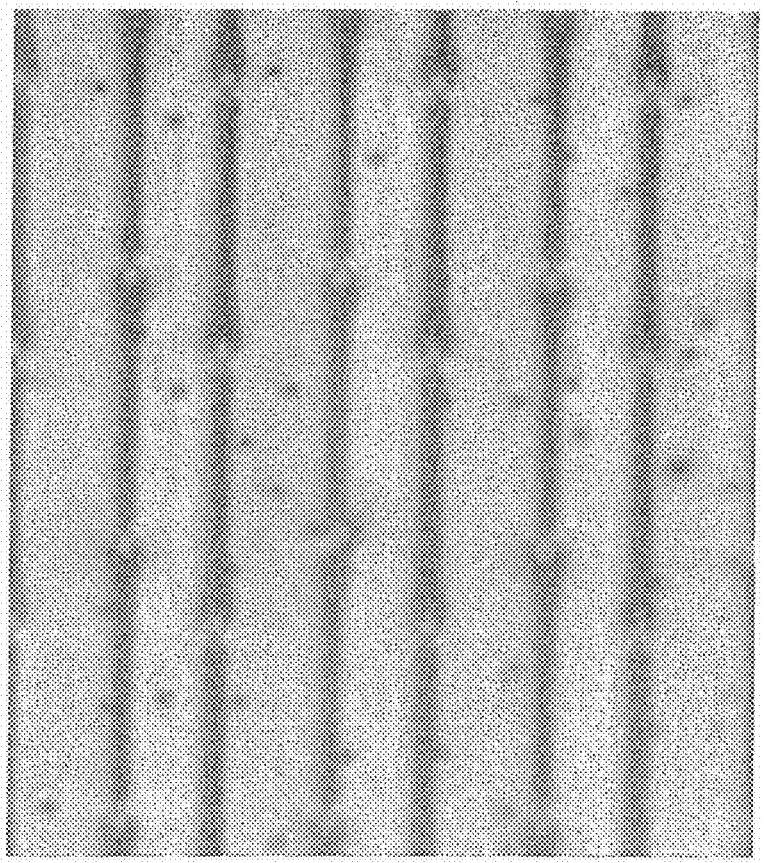
FIG. 7B is an alignment texture of the liquid crystal display element according to the fifth embodiment, which is observed by using a transmission microscope.

FIG. 7B is an alignment texture of the liquid crystal display element according to the fifth embodiment, which is observed by using a transmission microscope. The observation was performed under the same conditions as those of the observation image of the first embodiment illustrated in FIG. 3B.

Similarly to the liquid crystal display element according to the first embodiment, in the plan view, between the openings adjacent to each other in the width direction of the opening, a uniform alignment state is obtained, and even between the two openings adjacent to each other along the lengthwise direction (in the separation portion), alignment defects are not generated.

Figure 12:
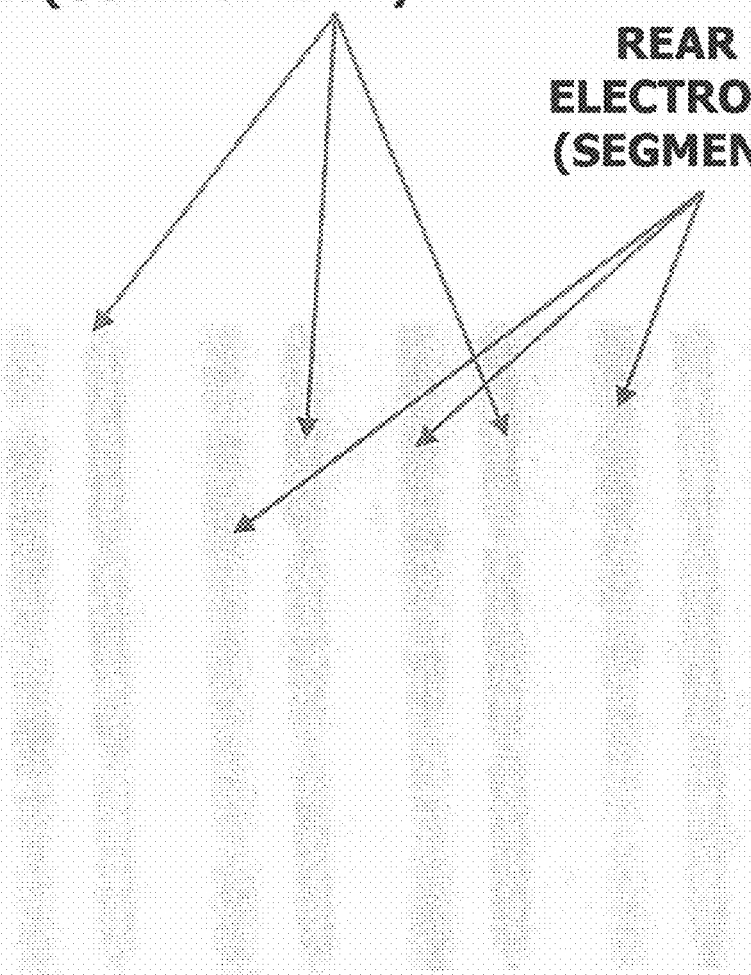
FIG. 12 illustrates a reflection microscope observation image of an element (empty cell) in which the distance between slit-like openings is smaller than an opening width.

In addition, the patterns of the openings 12*ao* and 12*bo* illustrated in FIG. 7A are formed by, for example, using a photomask having a shape corresponding to (the same shape as) the opening 12*ao*. In spite of Lp=0.0075 mm, unlike the case illustrated in FIG. 12, the joining of the slit-like openings is not recognized even on the outside of the illustrated region. Since one of the two openings adjacent to each other in the lengthwise direction has a large opposing portion width and the other thereof has a small opposing portion width, it becomes apparent that Lp on the mask can be reduced, and display failure such as display omission can be prevented while increasing the aperture ratio.

The liquid crystal display element according to the fifth embodiment can also exhibit the same effect as that of the first embodiment. In addition, since the arrangement area of the opening per electrode unit area is reduced, the liquid crystal display element according to the fifth embodiment is a liquid crystal display element having high transmittance compared to, for example, the first embodiment.

FIG. 8 is a schematic plan view of the openings 12*ao* and 12*bo* which are respectively formed in the front side electrode 12*a* and the rear side electrode 12*b* of the liquid crystal display element according to the sixth embodiment when viewed in the normal direction of the substrates 10*a* and 10*b*. The fifth embodiment has a structure without the region having the length La in the Y-axis direction, but may also have a structure without the region having the length Lb in the Y-axis direction or a structure without the region having the length Lc. The sixth embodiment has a structure without the region having the length Lb so that the region having the length La and the region having the length Lc are connected to each other at the edges that extend in the X-axis direction.

The liquid crystal display element according to the sixth embodiment can also exhibit the same effect as that of the fifth embodiment.

Figure 9:
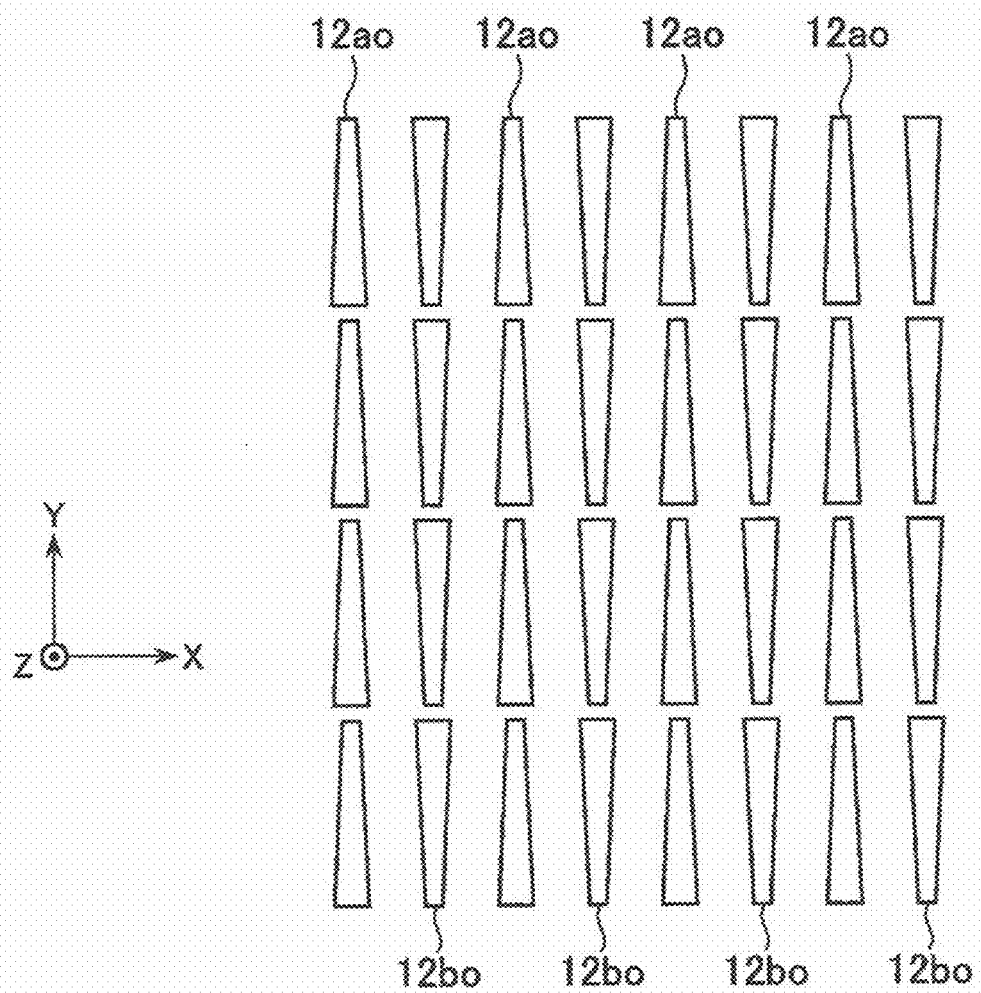
FIG. 9 is a schematic plan view of openings which are respectively formed in a front side electrode and a rear side electrode of a liquid crystal display element according to a seventh embodiment when viewed in the normal direction of substrates.

FIG. 9 is a schematic plan view of the openings 12*ao* and 12*bo* which are respectively formed in the front side electrode 12*a* and the rear side electrode 12*b* of the liquid crystal display element according to the seventh embodiment when viewed in the normal direction of the substrates 10*a* and 10*b*. In the seventh embodiment, each of the openings 12*ao* and 12*bo* is constituted by only the region having the length Lb (the trapezoidal region). In the example illustrated in this figure, the openings 12*ao* and 12*bo* having the same shape are arranged to be oriented in opposite directions, and the positions of the openings 12*ao* and 12*bo* are aligned with each other in the X-axis direction. Pn=Pw is satisfied. The openings 12*ao* and 12*bo* may be arranged to be oriented in the same direction, and the position of the opening 12*bo* may be shifted from the opening 12*ao* in the Y-axis direction.

Here, when the arrangement structure in which the openings 12*ao* and 12*bo* are oriented in opposite directions is employed, the aperture ratio can be increased to be higher than that of the case where the openings 12*ao* and 12*bo* are oriented in the same direction.

The liquid crystal display element according to the seventh embodiment can also exhibit the same effect as that of the fifth embodiment.

FIGS. 10A to 10C are schematic plan views illustrating the openings 12*ao* and 12*bo* of liquid crystal display elements according to modification examples. In the embodiments, the openings 12*ao* and 12*bo* are configured as openings having the same shape. However, when the two openings adjacent to each other along the lengthwise direction are viewed, under the condition that one of the opening widths of the opposing portions is large (Sw) and the other is small (Sn), the openings 12*ao* and 12*bo* may be configured as openings having a plurality of shapes. Even in this case, the distance (Lp) between the openings is equal to or less than Sw, and preferably equal to or less than Sn. In FIGS. 10A to 10C, examples in which the openings 12*ao* and 12*bo* having different shapes are regularly arranged along the lengthwise direction (the Y-axis direction) are illustrated.

FIG. 10A illustrates an example in which, as the openings 12*ao* and 12*bo*, two types of rectangular openings having different widths (lengths in the X-axis direction) are alternately arranged in the lengthwise direction (the Y-axis direction). In the plan view, the two types of rectangular openings are alternately arranged in the width direction (the X-axis direction). However, the same type of rectangular openings may be arranged to be lined up in the X-axis direction. Here, the configuration in which the two types of rectangular openings are alternately arranged even in the X-axis direction can reduce the arrangement area of the openings per unit area.

In addition, as illustrated in FIG. 10B, the long side edges of the rectangular having a large width may also be provided with depressions.

Furthermore, as illustrated in FIG. 10C, openings having three types of shapes may also be used. Openings having four or more types of shapes may also be used.

Even in the modification examples illustrated in FIGS. 10A to 10C, the position of the opening 12*bo* may be shifted from the opening 12*ao* in the Y-axis direction.

FIGS. 11A to 11C are schematic plan views illustrating the openings of liquid crystal display elements according to modification examples. In the embodiments and the modification examples illustrated in FIGS. 10A to 10C, the openings 12*ao* and 12*bo* have bisymmetrical shapes, and are arranged to be bisymmetrical when a single row along the lengthwise direction (the Y-axis direction) is viewed. However, the openings may have asymmetrical shapes (FIGS. 11A and 11B), or may be arranged to be asymmetrical when a single row along the lengthwise direction (the Y-axis direction) is viewed (FIGS. 11A to 11C).

While the present invention has been described above according to the embodiments and the like, the present invention is not limited thereto.

For example, in the embodiments and the modification examples, both the openings 12*ao* and 12*bo* are formed so that one of the opening widths of the opposing portions of the two openings adjacent to each other along the lengthwise direction is large and the other thereof is small. However, only one of the openings 12*ao* and 12*bo* may be formed as such.

In addition, in the embodiments and the modification examples, both the electrodes 12a and 12b include the openings which are elongated in the Y-axis direction. However, only one of the electrodes 12a and 12b may be configured to include the openings which are elongated in the Y-axis direction.

In addition, it should be noted by those skilled in the art that various modifications, improvements, combinations, and the like are possible.

For example, the invention can be appropriately used in a multi-domain vertical alignment type liquid crystal display element. In addition, the invention can be used in an in-vehicle device, a vehicle, a railway vehicle, a mechanical device, an industrial device, and the like provided with the multi-domain vertical alignment type liquid crystal display element.

What is claimed is:

1. A liquid crystal display element comprising:
    a first substrate which includes a first electrode;
    a second substrate which is disposed to oppose the first substrate and includes a second electrode; and
    a liquid crystal layer which is disposed between the first substrate and the second substrate,
    wherein at least one of the first electrode and the second electrode includes a plurality of openings which are elongated in a first direction and are adjacent to each other along the first direction,
    wherein an opening width of a first portion of two openings of the plurality of openings which are adjacent to each other along the first direction is larger than an opening width of a second portion of the two openings adjacent to each other along the first direction, and
    wherein when a voltage is applied between the first electrode and the second electrode, a dark region in a crossed state is generated between the two openings adjacent to each other along the first direction.

2. The liquid crystal display element according to claim 1, wherein a distance between the two openings adjacent to each other along the first direction is equal to or less than the opening width of the first portion of the two openings.

3. The liquid crystal display element according to claim 2, wherein the distance between the two openings adjacent to each other along the first direction is equal to or less than the opening width of the second portion of the two openings.

4. The liquid crystal display element according to claim 1, wherein the first and second portions of each of the two openings are arranged in a direction parallel to the first direction.

5. The liquid crystal display element according to claim 4, wherein each of the two openings includes a third portion connecting the first and second portions, and wherein edges of the third portion are not parallel to each other in the first direction.

6. The liquid crystal display element according to claim 1, wherein:
    each of the first electrode and the second electrode includes the plurality of openings which are elongated in the first direction and are adjacent to each other along the first direction,
    the plurality of openings of the first electrode along the first direction and the plurality of openings of the second electrode along the first direction are alternately arranged along a direction intersecting the first direction, and
    the plurality of openings of the second electrode along the first direction are arranged to be shifted from the plurality of openings of the first electrode along the first direction.

7. The liquid crystal display element according to claim 1, wherein the plurality of openings which are elongated in the first direction and are adjacent to each other along the first direction are configured as openings having a plurality of shapes.

8. The liquid crystal display element according to claim 2, wherein a distance between the two openings adjacent to each other along the first direction is greater than the opening width of the second portion of the two openings.

9. The liquid crystal display element according to claim 1, wherein:
    the plurality of openings include openings which are arranged adjacent to each other along a second direction perpendicular to the first direction, and
    respective regions between the openings adjacent to each other along the first direction are arranged in the second direction.

10. The liquid crystal display element according to claim 1, wherein:
    the plurality of openings include openings which are arranged adjacent to each other along a second direction perpendicular to the first direction, and
    a minimum value of distances between edges of the openings adjacent to each other along the second direction is larger than the opening width of the first portion of the two openings.

11. The liquid crystal display element according to claim 1, wherein:
    the plurality of openings include openings which are arranged adjacent to each other along a second direction perpendicular to the first direction, and
    a minimum value of distances between edges of the openings adjacent to each other along the second direction is larger than a distance between the two openings adjacent to each other along the first direction.

12. The liquid crystal display element according to claim 1, wherein:
    each of the first electrode and the second electrode includes the plurality of openings which are elongated in the first direction and are adjacent to each other along the first direction,
    the plurality of openings of the first electrode along the first direction and the plurality of openings of the second electrode along the first direction are alternately arranged along a second direction perpendicular to the first direction, and
    when a voltage is applied between the first electrode and the second electrode, orientation directions of liquid crystal molecules are opposite to each other on both sides of each of the openings in the second direction.

* * * * *